(No Model.)
E. S. GRAHAM.
CAR FENDER.
No. 556,969. Patented Mar. 24, 1896.
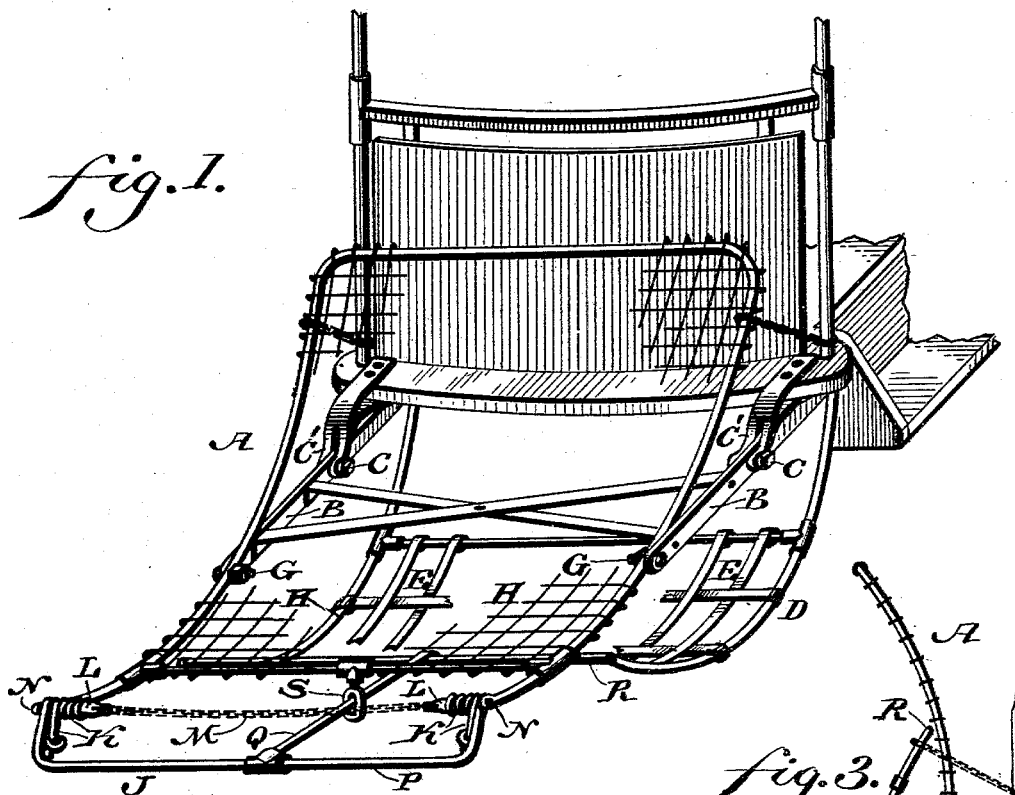
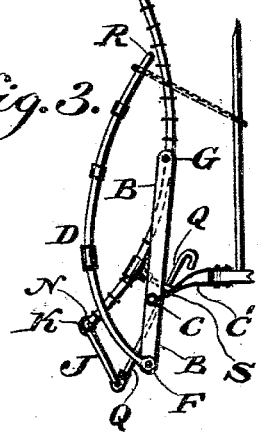
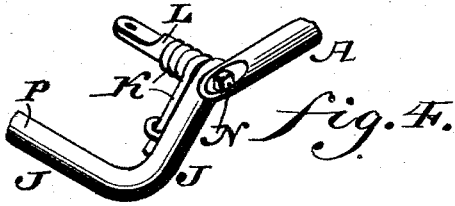
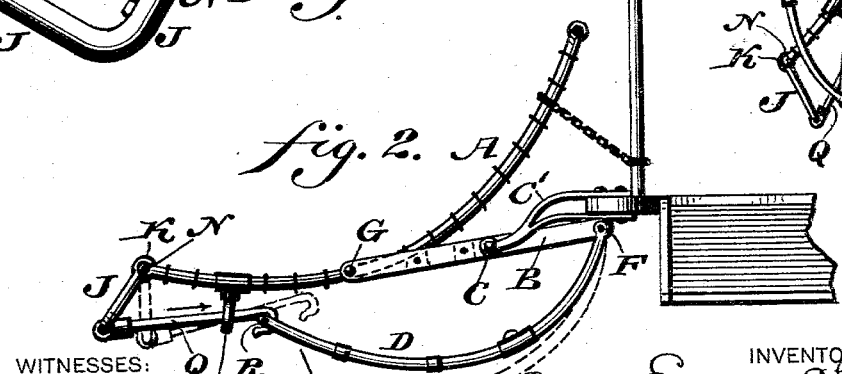
WITNESSES:
L. Douville,
P. H. Eagle,
INVENTOR
Edward S. Graham
BY John A. Wiedersheim
ATTORNEY.

UNITED STATES PATENT OFFICE.

EDWARD S. GRAHAM, OF PHILADELPHIA, PENNSYLVANIA.

CAR-FENDER.

SPECIFICATION forming part of Letters Patent No. 556,969, dated March 24, 1896.

Application filed November 27, 1895. Serial No. 570,295. (No model.)

*To all whom it may concern:*

Be it known that I, EDWARD S. GRAHAM, a citizen of the United States, residing in the city and county of Philadelphia, State of Pennsylvania, have invented a new and useful Improvement in Car-Fenders, which improvement is fully set forth in the following specification and accompanying drawings.

My invention consists of a fender provided with a pick-up and a trip whereby said pick-up may be released and permitted to assume an operative position.

Figure 1 represents a perspective view of a car-fender embodying my invention. Fig. 2 represents a side elevation thereof. Fig. 3 represents a side elevation of the device in folded condition. Fig. 4 represents a perspective view of a detached portion.

Similar letters of reference indicate corresponding parts in the several figures.

Referring to the drawings, A designates a fender which is mounted on the oscillating arms B, the latter being connected by the pivots C with the brackets C', the latter being attachable to a proper part of the floor or platform of the car.

D designates a pick-up, which consists of a suitable frame, with netting, lacing, or open-work forming a bed E and mounted on the rear ends of the arms B, as at F, it being noted that the fender is mounted on the front ends of said arms, as at G.

The netting or open-work which forms the bed H of the fender and that of the pick-up is shown as partly removed from the frames which carry the same.

Pivoted to the front ends of the frame of the fender is a trip J, which consists of a bent frame whose side limbs are mounted on the frame of the fender and are engaged by the springs K, which press forward the trip and serve to hold the same in operative position and are connected with the plugs L on the chain or cross-bar M, which latter is attached to said plugs, which are connected with the pivots or axial bolts N of the trip, said chain or cross-bar serving as a brace, preventing lateral spreading of the forward end of the fender and side limbs of the trip, and acting in a measure as the top of said trip.

Connected with the cross-bar P of the trip is a dog Q, which is adapted to be hooked to or engage with the front cross-bar R of the pick-up, said dog being guided in the eye S, which depends from one of the cross-bars of the fender.

The operation is as follows, the parts being in the position shown in Fig. 2: Should a person or object be struck by the fender, he or it may fall into the same and thus be carried with comparative safety. The trip will also be pushed rearwardly, whereby the hook of the dog Q is disengaged from the pick-up and the latter is permitted to drop close to the track or road-bed, whereby should the person or object fail to fall into the fender and drop beneath the same the pick-up will be in such position as to receive the person or object and thus carry the same. When the person or object is removed, the pick-up may be reset and engaged and locked by the dog so as to be held properly elevated above the track or road-bed, as shown in Fig. 2. When the dog Q is released the parts may be readily folded, as shown in Fig. 3.

Having thus described my invention, what I claim as new, and desire to secure by Letters Patent, is—

1. A fender, an oscillating arm carrying the same, and a pick-up which is mounted on said arm, in combination with means for holding said pick-up in elevated position, and releasing the same to permit it to drop.

2. A pivoted fender, a pivoted pick-up underneath the same, a trip having a spring connected with the front of said fender, and a dog connected with said trip, guided on said fender and adapted to engage said pick-up, said parts being combined substantially as described.

3. A fender mounted on an arm and provided with a depending eye, a trip mounted on said fender, and a dog carried by said trip, guided in said eye, in combination with a pick-up, which is mounted on said arm and adapted to be engaged by said dog, substantially as described.

4. A fender and a pick-up, together with a trip on the fender, for holding and releasing said pick-up, in combination with plugs on the axis of said trip, springs connected with said trip and plugs and a cross-bar attached to said plugs, substantially as described.

EDWARD S. GRAHAM.

Witnesses:
JOHN A. WIEDERSHEIM,
WM. C. WIEDERSHEIM.